United States Patent [19]
Abram

[11] Patent Number: 5,502,588
[45] Date of Patent: Mar. 26, 1996

[54] OPTICAL TRANSMISSION PROCESS AND SYSTEM FOR SENDING SOLITONS OVER VERY LONG DISTANCES

[75] Inventor: Izo Abram, Saint Cloud, France

[73] Assignee: France Telecom, France

[21] Appl. No.: 81,798

[22] Filed: Jun. 23, 1993

[30] Foreign Application Priority Data

Jun. 24, 1992 [FR] France ............................ 92 07722

[51] Int. Cl.[6] .................................................. H04B 10/00
[52] U.S. Cl. ........................ 359/154; 359/160; 359/161; 359/173; 359/188
[58] Field of Search .................................. 359/120–122, 359/134, 135, 140, 154, 156, 160–161, 173, 178–179, 181, 183, 188, 192, 195, 174, 333, 341; 372/6; 388/122, 24

[56] References Cited

U.S. PATENT DOCUMENTS 4,486,885  12/1984  Genack .................................... 359/333

FOREIGN PATENT DOCUMENTS 0076532  4/1988  Japan ..................................... 359/109
2007430  4/1992  WIPO ..................................... 359/188

OTHER PUBLICATIONS

Iwatsuki et al., "40 Ghit/s Optical Soliton Transmission over 65 KM", Electronics Letters, 10th Sep. 1992, vol. 28, No. 19, pp. 1821–1822.

*Primary Examiner*—Leo Boudreau
*Assistant Examiner*—Kinfe-Michael Negash
*Attorney, Agent, or Firm*—Blakely, Sokoloff, Taylor & Zafman

[57] ABSTRACT

An optical transmission method and system for sending at least one stream of solitons over very long distances. The stream of solitons is stabilized by introducing repulsive interactions between each soliton and the immediately preceding soliton and immediately following soliton. This stabilization is affected by optical phase modulation of the solitons producing an alternation of Π radians in the relative phases between consecutive solitons. The information is coded by polarization modulation. The invention is useful in many industries such as the telecommunications industry.

24 Claims, 3 Drawing Sheets

OPTICAL TRANSMISSION PROCESS AND SYSTEM FOR SENDING SOLITONS OVER VERY LONG DISTANCES

BACKGROUND OF THE INVENTION

1. Field of the Invention

The present invention concerns an optical transmission process and system for sending solitons over very long distances.

2. Description of the Prior Art

Light pulses can now be transmitted in optical fibers over intercontinental distances due to the development of optical amplifiers such as doped fiber and semiconductor amplifiers, Raman amplifiers, and parametric amplifiers. These amplifiers enable data transmission at much higher bit rates and at much lower cost than electronic regenerators. FIG. 1 is a diagrammatic representation of a transmission system between a transmitter sender (E) 2 and a receiver (R) 8 comprising optical amplifiers (AO) 6. The system comprises multiple sections ($T_f$) 4 of monomode optical fiber interconnected to transmit light pulses. The system also includes devices which amplify these light pulses by injecting optical energy into them without converting them into electronic pulses. The optical amplification may be "distributed" all along the fiber (as in the case of Raman amplifiers and low doped fiber amplifiers) or "lumped" at relatively compact modules spaced by 25 to 150 km apart depending on the characteristics of the transmission system.

However, optical amplification does not re-shape the transmitted signal. Thus, the distortion of each pulse, as it propagates, is cumulative, restricting the reliability of transmission. Optical pulses are usually affected by two physical phenomena causing distortion: chromatic dispersion and the optical non-linearity of the fiber.

There are, however, special light pulses called "solitons" whose shape and intensity characteristics are such that the two types of distortion (chromatic and nonlinear) cancel out. This cancellation occurs when the chromatic dispersion of the fiber is "anomalous" with a negative coefficient for the group velocity dispersion. For the silica fibers used presently this condition is satisfied in the so-called minimal attenuation" window in the vicinity of the wavelength of 1.5 μm.

The propagation of light pulses in optical fibers is expressed by the non-linear Schrödinger equation. Light pulses in which the profile of the electric field is the shape of a hyperbolic secant (sechx=1/cosh X) are specific solutions of this equation and constitute solitons. These optical solitons can therefore propagate in an optical fiber over intercontinental distances with no distortion provided that their attenuation is compensated by periodic amplification. The current state of the art and performance characteristics of optical communication systems using soliton pulses are summarized in the following reference documents:

[1] S. G. Evangelides, L. F. Mollenauer, J. P. Gordon, and N. S. Bergano, "Polarization multiplexing with solitons", Journal of Lightwave Technology, vol. 10, 28–35 (1992).

[2] M. Nakazawa, K. Suzuki, Eo Yamada, and H. Kubota, "Observation of nonlinear interactions in 20 Gbits/s soliton transmission over 500 km using erbium-doped fiber amplifiers", Electronics Letters, vol. 27, 1662–1663 (1991).

[3] L. F. Mollenauer, M. J. Neubelt, S. G. Evangelides, J. P. Gordon, J. R. Simpson, and L. G. Cohen, "Experimental study of soliton transmission over more than 10000 km in dispersion-shifted fiber", Optics Letters, vol. 15, 1203–1205 (1990).

[4] J. P. Gordon and H. A. Haus, "Random walk of coherently amplified solitons in optical fiber transmission, Optics Letters, vol. 11, 665–667 (1986).

The prior art has the drawbacks described below.

Amplitude modulation coding as currently used for soliton transmission, is of the all-or-nothing on-off keying (OOK) type. The presence of a pulse in a time window (a time interval defined by a clock and also known as the "bit period") represents the binary digit 1 and its absence denotes the binary digit 0. For example, transmitting the binary digit 11 entails launching two solitons into the fiber in two consecutive bit periods. For each of the two solitons the presence of the other disturbs the delicate equilibrium between chromatic and non-linear distortion and this is manifested as interaction between the solitons: as they propagate the two solitons coalesce and separate periodically. If the initial separation $q_o$ between the solitons is in the order of three soliton widths LS ($q_o$=3 LS, with the soliton width defined as the full width of the pulse at half-maximum), the pulses coalesce after propagating 450 km which compromises the reliability of decoding beyond 350 km (see reference [2]). Moreover, reliable transmission over 10000 km (for which the coalescence distance is 13000 km) requires an initial separation $q_o$=6 LS (see reference [3]). Consequently, in addition to restricting transmission range, interaction between solitons sets a minimal value for the bit period, which restricts the bit rate.

A second restriction on the bit rate and range of soliton transmission results from the noise which is introduced upon the optical amplification of the pulse stream. This noise is usually manifested as a random component of the speed of the soliton, causing at the receiving end some uncertainty as to the position of the soliton in the bit period frame. The range and bit rate for reliable transmission are therefore restricted to values for which the jitter of the soliton due to amplification noise does not exceed a fraction of the bit period. This is the Gordon-Haus limit; (see reference [4]).

[4]J. P. Gordon and H. A. Haus, "Random walk of coherently amplified solitons in optical fiber transmission", Optics Letters, vol. 11, 665–667 (1986).

SUMMARY OF THE INVENTION

An object of the present invention is to provide a soliton communication system in which interaction between solitons can be compensated in order to increase the data transmission range and/or bit rate. Compensating these interactions eliminates the coalescence of adjacent pulses and produces robust streams of solitons resistant to random fluctuations in speed and position such as the jitter affecting isolated solitons due to amplification noise.

The process includes methods of coding data which preserve the compensation of interaction between solitons and which largely preserve the stable character of a stream of pulses.

Embodiments of optical pulse senders and receivers adapted to the requirements of transmitting stable streams of solitons are also described.

Optical communication by means of stable streams of solitons may be implemented on one or more data transmission channels. If the system includes more than one transmission channel, the channels are time-division multiplexed.

In one embodiment, the present invention includes an optical transmission method for sending a stream of solitons over very long distances. This method includes the following steps:

generating at least one stream of light pulses in which each pulse is sent inside a time window, consecutive time windows being contiguous and of the same duration, the light pulses having the same shape and the same amplitude which is greater than a threshold required to obtain soliton pulses when the stream propagates in a monomode optical fiber;

stabilizing each soliton inside its time window and thereby stabilizing said stream of solitons by introducing repulsive interaction between each soliton and the immediately preceding and following solitons;

coding the light pulses of said stream to introduce thereinto data to be transmitted;

injecting or coupling said stream of coded light pulses into said optical fiber;

propagating said stream of coded pulses in said monomode optical fiber in the form of soliton pulses, the monomode optical fiber having at the optical wavelength of the pulses a non-linear refractive index and an anomalous group velocity dispersion;

amplifying the soliton pulses optically as they propagate in the fiber;

receiving and decoding said stream of soliton pulses.

In a preferred embodiment of the process in accordance with the invention, the step of stabilizing said stream of solitons by introducing repulsive interaction is obtained by optical phase modulation of the solitons to produce an alternation of 0 and Π relative phases between consecutive solitons to produce a stream stabilized by alternation of phase.

In a preferred variant of the above-mentioned embodiment said coding is effected by polarization modulation of the solitons to preserve the stabilized nature of the stream of soliton, i.e., the repulsive nature of stabilizing interaction between adjacent solitons.

In an advantageous implementation of the above variant said coding is selected from the group comprising binary coding with two modulation values, discrete coding with M modulation values where M is greater than 2 and analog coding with continuous modulation values.

According to the invention, reception of said stream of solitons comprises a step of discriminating between modulation which codes the solitons and modulation which stabilizes the solitons.

According to a preferred embodiment of the process in accordance with the invention if generation of said stream of light pulses produces a pulse bit rate less than a required transmission bit rate the value of the generated bit rate is increased to the required transmission bit rate by the following steps:

i) splitting the generated stream between N identical channels where N is an integer greater than 1;

ii) introducing a relative time-delay between the N channels equal to qL/N where qL is the time interval between the pulses of the generated stream, iii) recombining the N channels to produce a series of pulses in which the time interval $q_o=qL/N$ between consecutive pulses is equal to the time window of the required bit rate, stabilization by alternation of phase of the stream having the required bit rate being effected before recombination, i.e., on each of the N channels separately, using a protocol producing alternating phases after recombination of the N channels.

According to the invention the coding of each of the N channels is effected separately prior to recombination according to said protocol so that after the N channels are recombined into a single stream they constitute a single data channel.

Also in accordance with the invention the coding of the N channels is effected prior to recombination independently on each of the N channels which thereby constitutes an independent data channel so that after recombination of the N channels the N data channels are interleaved and enable transmission of said independent channels in a time-division multiplexing configuration, reception of the stream of pulses at the required pulse bit rate being achieved by a step of detection on N channels, reception of the N channels detected independently, being effected by time-division demultiplexing.

In another aspect the present invention consists in an optical transmission system for sending at least one stream of solitons over a very long distance, said system comprising:

means for generating at least one stream of light pulses in which each pulse is sent inside a time-window, consecutive time windows being contiguous and of the same duration, the light pulses having the same shape and the same amplitude which is greater than a threshold required to obtain soliton pulses when the stream propagates in a monomode optical fiber;

means for coding the light pulses of said stream to introduce thereinto data to be transmitted;

means for injecting or coupling said stream of coded pulses into said optical fiber;

means for propagating the light pulses in the form of soliton pulses, said propagation means comprising said monomode optical fiber which has at the optical wavelength of the pulses a non-linear refractive index and an anomalous group velocity dispersion;

optical amplification means for amplifying the soliton pulses as they propagate in the fiber;

means for receiving and decoding the stream of soliton pulses; and means for stabilizing each soliton in its time window and thereby stabilizing said stream of solitons by introducing repulsive interaction between each soliton and the immediately preceding and following solitons.

In a preferred embodiment of the system in accordance with the invention the means for stabilizing said stream of solitons by introducing repulsive interaction comprise at least one optical phase modulator which modulates the solitons to produce an alternation of 0 and Π relative phases between consecutive solitons to produce a stream stabilized by alternation of phase.

According to a preferred variant of the above mentioned embodiment said coding means comprise at least one soliton polarization modulator to preserve the stabilized nature of said stream of solitons, i.e., the repulsive nature of the stabilizing interaction between adjacent solitons.

According to the invention the means for receiving said stream of solitons comprise means for discriminating between the modulation coding the solitons and the modulation stabilizing the solitons.

According to a preferred embodiment of the system in accordance with the invention if the means for generating said stream of light pulses produce a pulse bit rate less than a required transmission bit rate the generated bit rate is increased to the required transmission bit rate by means of:

i) means for splitting the generated stream between N identical channels where N is an integer greater than 1;

ii) means for introducing a relative time-delay between the N channels equal to qL/N where qL is the time interval between the pulses of the generated stream, and iii) means for recombining the N channels to produce a stream of pulses in which the time interval qo=qL/N between consecutive pulses is equal to the time window of the required bit rate, the means for stabilizing the stream at the required bit rate by alternation of phase operating before the recombining means, i.e., on each of the N channels separately, using a protocol producing alternating phases or polarizations, respectively, after recombination of the N channels.

According to the invention the coding means operate before recombination on each of the N channels separately according to said protocol so that after the N channels are recombined into a single stream they constitute a single data channel.

Also according to the invention the means for coding the N channels operate before recombination independently on each of the N channels which thereby constitutes an independent channel so that said recombination means serve to multiplex the N independent data channels, the means for receiving the stream of pulses at the required pulse bit rate comprising N-channel detector devices, a demultiplexer receiving the N independent data channels.

In another aspect, the present invention consists in a sender for sending at least one stream of solitons comprising:

means for generating at least one stream of light pulses in which each pulse is sent inside a time window, consecutive time windows being contiguous and of the same duration, the light pulses having the same shape and the same amplitude which is greater than a threshold required to obtain soliton pulses when the stream propagates in a monomode optical fiber;

means for coding the light pulses of said stream to introduce thereinto data to be transmitted;

means for injecting or coupling said stream of coded light pulses into said optical fiber, and means for stabilizing each soliton inside its time window and thereby stabilizing said stream of solitons by introducing repulsive interaction between each soliton and the immediately preceding and following solitons.

In a preferred embodiment of the sender in accordance with the invention the means for stabilizing said stream of solitons by introducing repulsive interaction comprise at least one soliton optical phase modulator producing an alternation of 0 and Π relative phases between consecutive solitons to produce a stream stabilized by alternation of phase.

In a preferred variant of the above-mentioned embodiment of the sender said coding means comprise at least one soliton polarization modulator to preserve the stabilized nature of said stream of solitons, i.e., the repulsive nature of the stabilizing interaction between adjacent solitons.

In a preferred embodiment of the sender in accordance with the invention if the means for generating said stream of light pulses produce a pulse bit rate less than a required transmission bit rate the generated bit rate is increased to the required transmission bit rate by means of:

i) means for splitting the generated stream between N identical channels where N is an integer greater than 1;

ii) means for introducing a relative time-delay between the N channels equal to qL/N where qL is the time interval between the pulses of the generated stream, and iii) means for recombining the N channels producing a stream of pulses in which the time interval qo=qL/N between consecutive pulses is equal to the time window of the required bit rate, the means for stabilizing the stream at the required bit rate by alternation of phase operating before the recombining means, i.e., on each of the N channels separately, using a protocol producing alternating phases after recombination of the N channels.

According to the invention the coding means operate before recombination on each of the N channels separately according to said protocol so that after the N channels are recombined into a single stream they constitute a single data channel.

Also according to the invention the means for coding the N channels operate before recombination independently on each of the N channels which thereby constitutes an independent data channel so that said recombination means serve to multiplex the N independent data channels, the means for receiving the stream of pulses at the required pulse bit rate comprising N-channel detector devices, a demultiplexer receiving the N independently detected channels.

In another aspect, the present invention consists in a receiver for receiving at least one stream of solitons wherein it comprises means for discriminating between the modulation coding the solitons and the modulation stabilizing said stream of solitons by introducing repulsive interaction between each soliton and the immediately preceding and following solitons.

In a first preferred embodiment of the receiver in accordance with the invention the solitons are stabilized by soliton optical phase modulation to produce an alternation of 0 and Π relative phases between consecutive solitons producing a stream stabilized by alternation of phase and the solitons are coded by polarization modulation, said discrimination means comprising a polarization splitter.

In a preferred embodiment of the receiver in accordance with the invention if it receives a stream having a soliton transmission bit rate greater than a required reception bit rate the receiver comprises N-channel detector devices where N is an integer greater than 1 and a demultiplexer for receiving N independently detected channels.

The invention will be better understood from the following further description and the accompanying drawings which are provided by way of non-limiting example only.

DETAILED DESCRIPTION OF THE INVENTION

Figure 1:
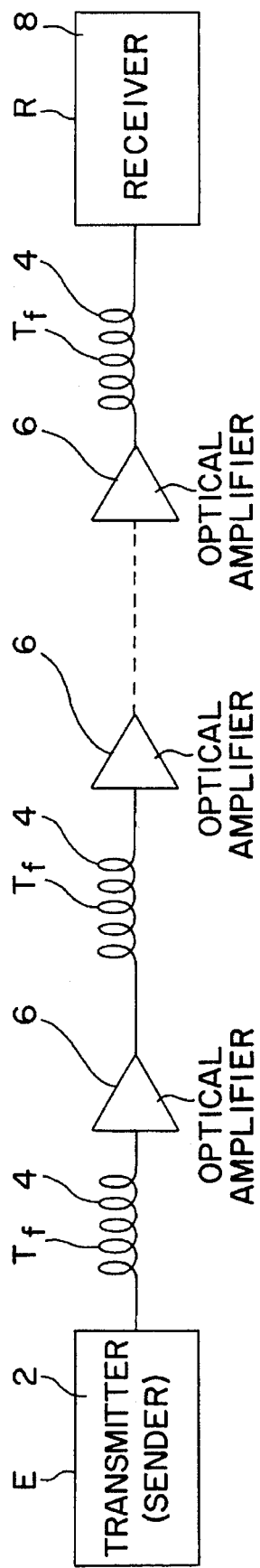
FIG. 1 is a block diagram showing an optical link for streams of solitons between a sender and a receiver.

The transmission method of this invention is based on the exploitation of the repulsion between solitons which are Π radians out of phase. This repulsion between adjoining solitons enables generation of robust and periodic streams of pulses with a stable pulse interval and immune to coalescence of solitons and to amplification jitter.

The present invention features two improvements over conventional soliton stream transmission.

First, its bit rate is higher as it enables the solitons to be closer together, typically by a factor in the order of three as compared with the separations employed in prior art systems.

Second, its range is increased because the stabilization of the stream of solitons by mutual repulsion eliminates coalescence of solitons and reduces amplification jitter. These two phenomena are therefore no longer limiting factors on transmission and the maximum range of the stabilized streams of solitons is limited by other physical phenomena such as higher order dispersion or higher order non-linearities, the extent of which have yet to be accurately quantified.

Turning to the principle of transmission by compensating interaction between solitons, the non-linear Schrödinger equation which governs the evolution of the soliton in the optical fiber can also describe the interactions which occur in a stream of solitons. An exact solution of this equation entails a difficult mathematical procedure (the inverse scattering method) or numerical simulation on a computer. The drawback of both these exact methods is that they do not lend themselves to simple interpretation nor giving an intuitive indication of simple trends. However, in the case of propagation of two clearly separated solitons (separation q>2 LS) there are approximate formulae which provide a simple and relatively accurate description of these interactions. If these formulae are applied to solitons that are very close together they are unable to provide accurate quantitative results (for q=2 the discrepancy with the exact solution is already a few percent) but can provide simple and qualitative information as to how the solitons evolve. Because of their simplicity these approximate formulae will be used in the arguments supporting this proposition.

Consider the propagation of two solitons of the same linear polarization and equal amplitude; the interaction between them depends on two relative parameters: their separation q and their relative phase φ. When they interact, the solitons evolve through modification of these two parameters. In the special cases φ=0 and φ=Π, the relative phase remains unchanged throughout the propagation of the pair and their interaction is similar to a "Newtonian force" between the two solitons producing an acceleration (see reference [5]):

[5] J. P. Gordon, "Interaction forces among solitons in optical fibers", Optics Letters, vol. 8, 596–598 (1983):

$$\ddot{q}=-2e^{-1.76q} \text{ for } \phi=0 \text{ and} \tag{1}$$

$$\ddot{q}=2e^{-1.76q} \text{ for } \phi=\Pi. \tag{2}$$

The soliton "force" is therefore an attractive force if the two solitons are in phase or a repulsive force if they are out of phase. It decreases exponentially as the separation between the two pulses increases.

If the solitons have different linear polarizations, the repulsive interaction between two solitons out of phase varies as a function of the angle between the two polarizations. The corresponding acceleration is given by the equation:

$$\ddot{q}=-4e^{-3.52q}+2e^{-1.76q}\cos a \tag{3}$$

where cos a is the cosine of the angle a between the two polarizations.

Figure 2:
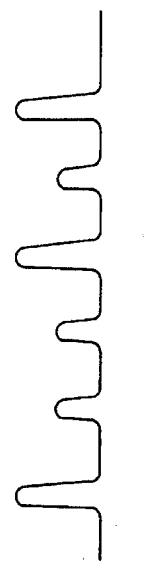
FIG. 2 is a diagram showing streams of solitons stabilized by means of the invention by compensating interaction between them in the sense that repulsion between each soliton and the two adjacent solitons stabilizes their relative distance. The stream of solitons is stabilized by phase alternation (APH), where the relative optical phase between consecutive solitons is Π.

Turning to the composition of stable streams of solitons: the analogy with conventional Newtonian forces provides a simple picture of complex interactions in a stream comprising a large number of solitons. Using the well known additive character of Newtonian forces, the total interaction in a stream of solitons may be expressed as a sum of binary forces between all possible pairs of solitons. This analysis implies that an infinite stream of equidistant solitons of the same amplitude can be stabilized if these forces are compensated symmetrically to the point of equilibrium of each soliton. This stabilization occurs for streams of solitons with the same polarization but whose optical phase alternates by Π between adjacent solitons, denoted APH streams hereinafter (streams stabilized by alternation of phase, see FIG. 2).

In this case the stream is stabilized by the repulsive forces between adjacent solitons, producing stable equilibrium. During propagation, if a soliton moves towards one of its neighbors the mutual repulsion acts as a restoring force which returns the soliton to its point of equilibrium and maintains the mean distance between solitons essentially constant. Consequently, in an APH stream the pulses usually oscillate by a small distance around their respective equilibrium point. The amplitude of such oscillation decreases rapidly as the equilibrium distance between adjacent solitons decreases, because the restoring force is exponentially related to the displacement. This implies that in a stream of solitons stabilized by alternation of phase the effects of amplification jitter are very much limited by the restoring force.

A stream comprising pulses with the same phase and polarization would be stabilized by attractive forces between adjacent solitons (equation 1). This would be unstable equilibrium, however. During propagation, if a soliton approaches one of its neighbors (the preceding soliton, for example) the attraction to this neighbor becomes stronger while the attraction to the other neighbor (i.e., the next soliton) becomes weaker: the soliton will therefore continue to move towards the first neighbor (the preceding soliton) until it coalesces with it, so initiating destabilization of the stream.

Recent research has shown that the phase and polarization relationships between solitons remain unchanged throughout propagation despite fiber inhomogeneities and fluctuations if the solitons have a common history (see reference [1]). This implies that the alternations of APH streams are preserved during propagation. Consequently, compensation of interaction between solitons and immunity to jitter due to the exponential restoring force in compact streams indicates that APH streams can propagate over intercontinental distances with the separation between solitons held constant.

Turning to the coding of stabilized streams of solitons: the application of the conventional OOK coding process to APH soliton streams would introduce gaps which would eliminate the compensation of forces between the solitons. consequently, OOK coding would eliminate all the advantages of a compact stabilized stream and would re-introduce the limitations due to interaction and to jitter from which soliton communications currently suffer.

The present invention proposes methods of coding suitable for the stabilized stream. The coding principle adopted is based on maintaining the repulsive forces between adjacent neighbors by rotating the polarization of a soliton through an appropriate angle. This largely preserves the equilibrium of forces and consequently the coded streams can propagate over intercontinental distances without deterioration of the data. A non-limiting example is given below of the coding principle adopted with an outline examination of the dynamics of binary coded streams. The following description applies in principle not only to binary coding but also to coding with M discrete values (M>2) and to analog coding with continuous values.

The APH streams may be binary coded by rotating the polarization of solitons representing the binary digit 1 through an appropriate angle (the optimum value of this angle depends on the bit rate and the duration of the soliton and on the transmission distance), solitons which retain their original polarization representing the binary digit 0. For example, if the binary sequence . . . 00100 . . . is coded onto an APH stream the polarization of one soliton is rotated 45°; the series of solitons near the coded bit may be represented as follows:

$$0^{(-3)}\Pi^{(-2)}0^{(-1)}p^{(0)}0^{(1)}\Pi^{(2)}0^{(3)} \ldots \text{ where} \qquad (4)$$

0 and π represent soliton pulses with respective relative phases of 0 and Π, P represents the soliton whose polarization is rotated and the exponents denote the position of each soliton relative to the coded bit.

Figure 3:
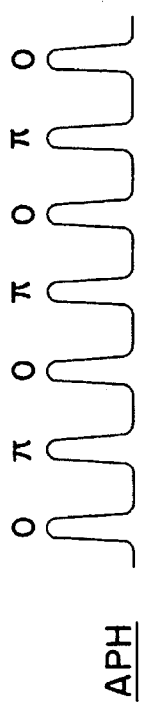
FIG. 3 is a diagram showing an APH stream coded by polarization modulation.

The replacement of "phase" type repulsive forces (equation 2) by polarization type repulsive interactions (equation 3) in the coding process changes the equilibrium of the soliton forces. In particular, for a polarization rotated 45°, the equilibrium point of the pulse at position 1 would be shifted because of such substitution, by 0.17 LS on average. For an initial soliton spacing of $q_o$=3 LS this displacement may be seen at the receiving end as an uncertainty as to the position of the soliton (i.e., jitter) in the order of 6% of the bit period, independent of the transmission distance. Given the relatively short range of the soliton force, the next-nearest neighbors are not significantly disturbed by the coding process: their equilibrium point is usually displaced by less than 18 of the bit period. The dynamics of streams coded with longer sequences are based on the same principles and yield similar results. FIG. 3 shows an example of coding an APH stream with a longer and therefore more complex sequence, specifically the sequence . . . 011010 . . . In this figure the basic framework is made up of solitons whose phase alternates by Π and coding is effected by rotating the polarization of the second, third and fifth solitons 45°.

In coding with M>2 discrete values (0, 1, 2 . . . , (M−1)), the mth value is coded by rotating the polarization by $[(m-1)/(M-1)].a_{max}$ where $a_{max}$ is an appropriate maximum angle. For analog coding all values of polarization between 0 and $a_{max}$ are allowed.

This analysis shows that the APH streams retain their stability after coding and can therefore propagate over long distances without deterioration of the data. It is obvious that for a stream of limited length or duration the first few and last few pulses are not well stabilized and so must not comprise any coding.

The process of optical communication by means of stabilized streams of solitons may be implemented with integrated optical components (or "bulk" optical components) already available, although the future development of dedicated hardware could optimize some stages of the process. Implementation of this process using widely available optoelectronic components is discussed below as a non-limiting example of the implementation possibilities.

A stream of light pulses comprising a very large number of equidistant pulses with substantially the same shape, amplitude and phase can be produced by a mode-locked laser. It is well known that to launch solitons into an optical fiber the pulses supplied by the laser do not need to have a hyperbolic secant profile which is the exact shape of a fundamental soliton. Pulses of similar shape (such as the Gaussian shape usually produced by mode-locked lasers) can equally well be launched into the fiber: in this case, if the pulse intensity exceeds a particular threshold, they evolve towards the hyperbolic secant shape of the fundamental soliton as they propagate in the fiber.

The spacing qL (i.e., the time interval between pulses of the stream generated by the mode-locked laser) is usually equal to several pulse widths. This spacing can be reduced by an integer factor N (N>1) by a three-stage procedure:

(1) Splitting the stream between N identical channels, (2) Introducing a relative time-delay of qL/N between the N channels, (3) Recombining the three channels, this procedure producing a stream of pulses spaced by $q_o$=qL/N where qo is the time window of the required pulse bit rate.

It is possible to stabilize this APH stream by modulating the phase of alternate pulses in the recombined stream using electro-optical phase modulators. However, it is preferable to apply this phase modulation to each of the N channels separately using a protocol producing phase alternation after recombination of the N channels. The simplest case is where N is an even number. Binary data can be coded either on the recombined stream or on each channel individually, prior to recombination. The latter option has various advantages:

(a) It combines the two modulation processes (stabilization and coding) into a single process.

(b) Each channel can be coded independently of the others, provided that the protocol of the alternations required for stabilization is complied with. This yields the option of transmitting N independent time-division multiplexed channels after recombination.

(c) The coding of each individual channel is slower by a factor N than the transmission bit rate, and can therefore be matched to the bandwidth of available electro-optical components.

(d) If the spacing of the solitons in the recombined stream is in the order of $q_o$≦2 LS, adjacent solitons have a non-negligible overlap which makes it difficult or even impossible to modulate the phase or the polarization of an individual soliton. Coding a stream which is less dense by a factor N makes it possible to maintain the integrity of the soliton pulses during modulation.

Figure 4:
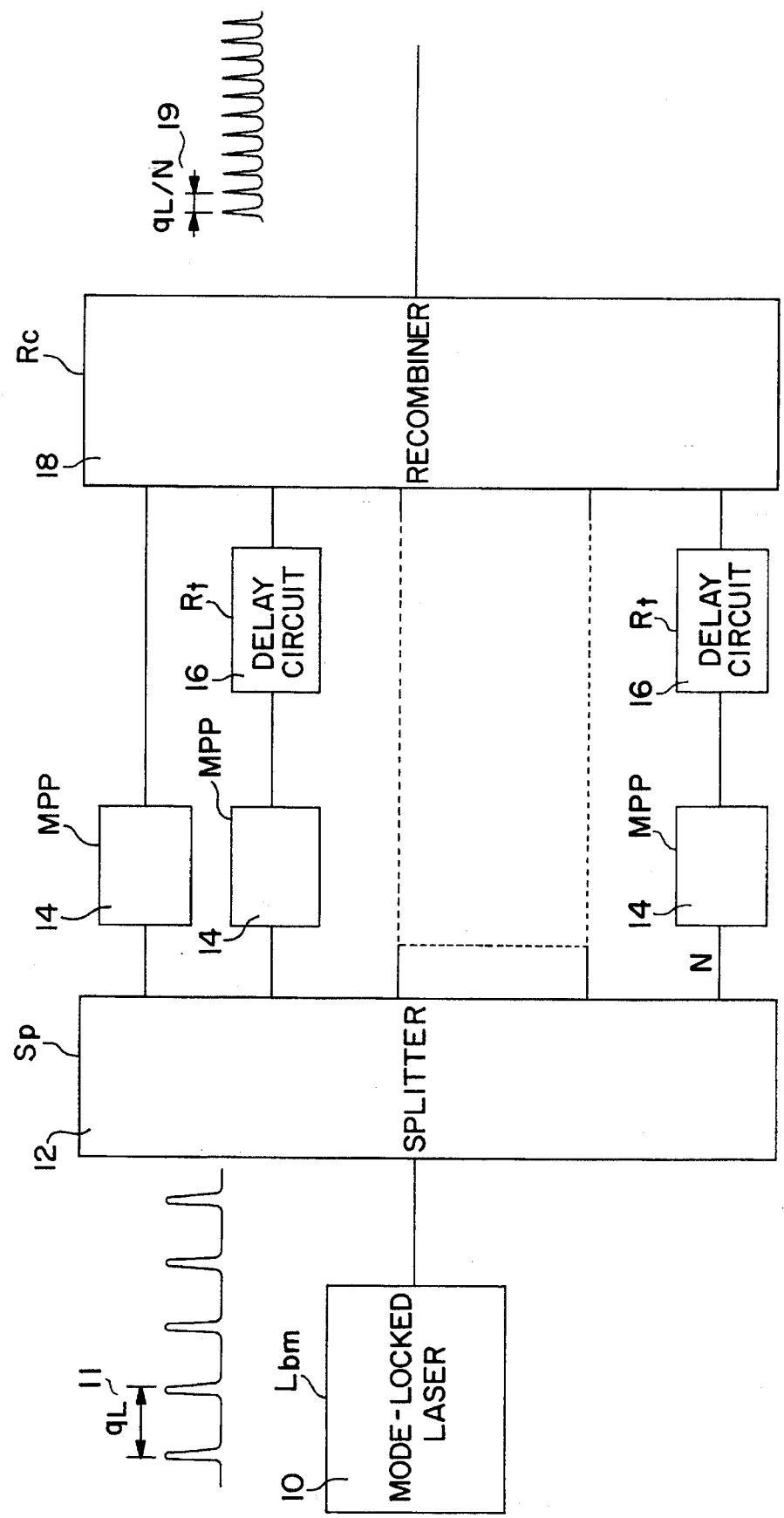
FIG. 4 is a diagram showing the general configuration of a sender that produces and encodes data onto a stream of solitons which is stabilized by application of the invention, using a mode-locked laser that generates pulses at a bit rate lower than the required transmission bit rate.

FIG. 4 is a diagram showing the general case in which a stream of light pulses is sent by a mode-locked laser ($L_{bm}$) 10 at a bit rate which defines a spacing (qL) 11 between pulses and is less than a required transmission bit rate. Splitter (Sp) 12 splits this stream of light pulses between N channels by a splitter Sp. Phase modulation and polarization modulation, as required by the invention to stabilize and code the pulses are applied on each channel by means of a single device MPP 14 which executes both of these functions simultaneously. Devices ($R_t$) 16 introduce a relative time-delay (qL/N) 17 between a channel and the previous channel so that for the nth channel the time-delay is (n−1)qL/N. A recombiner ($R_c$) 18 produces a stream at the required transmission bit rate, i.e., pulses, spaced by $q_o$=qL/N.

To obtain a better understanding of the composition and the coding of stabilized soliton streams consider the case (N=4) where the time interval qL between the pulses supplied by the mode-locked laser is four times greater than the interval between solitons in the stream obtained at the output of the send module. All hardware units mentioned in the following discussion are well known to scientists and technicians working in this field and their operation will therefore not be explained here.

The stream of pulses from the mode-locked laser is split between four channels (hereinafter called $V_1$, $V_2$, $V_3$, $V_4$) using a "star coupler", which is routinely used to interconnect fibers. Each channel comprises a phase modulator, a polarization modulator and an optical delay line. The two modulators may be separate or constitute a single unit which executes both functions simultaneously. The delay line of each channel must be set to the required time-delay. For channel $V_1$ the time-delay R1 may be a null time-delay ($R_1=0$). For $V_2$ the time-delay is set at $R_2=qL/4$. For $V_3$ the time-delay is $R_3=qL/2$. For $V_4$ the time-delay is $R_4=3qL/4$. Each delay line may comprise an optical fiber of appropriate length. For example, for channel i the length Li is given by $L_i=vR_i$, where v is the group velocity of the pulses. After introduction of the time-delays, when the four channels are recombined by a second "star coupler" a single stream of pulses four times more dense results.

To build an APH stream, the phase modulators of channels $V_2$ and $V_4$ must shift (delay) by Π, the phase of any pulse passing through them, and the phase of the pulses on channels $V_1$ and $V_3$ must remain the same. If a series of bits must be coded onto the APH stream then the bits are divided into consecutive sequences of four bits (hereinafter denoted $B_1$, $B_2$, $B_3$, $B_4$, $B_1$, $B_2$, etc.). The first bit, $B_1$, in each sequence is coded by the polarization modulator of channel $V_1$. The second bit, $B_2$, by the modulator of channel $V_2$. The third bit $B_3$ is coded by channel $V_3$, and B4 is coded by the modulator of $V_4$. Subsequent to sequences are coded in a similar fashion. After the four channels are recombined by the second Mostar coupler, the stabilized and polarization modulation coded APH stream can be transmitted to the receiver through the monomode fiber system.

Figure 6:
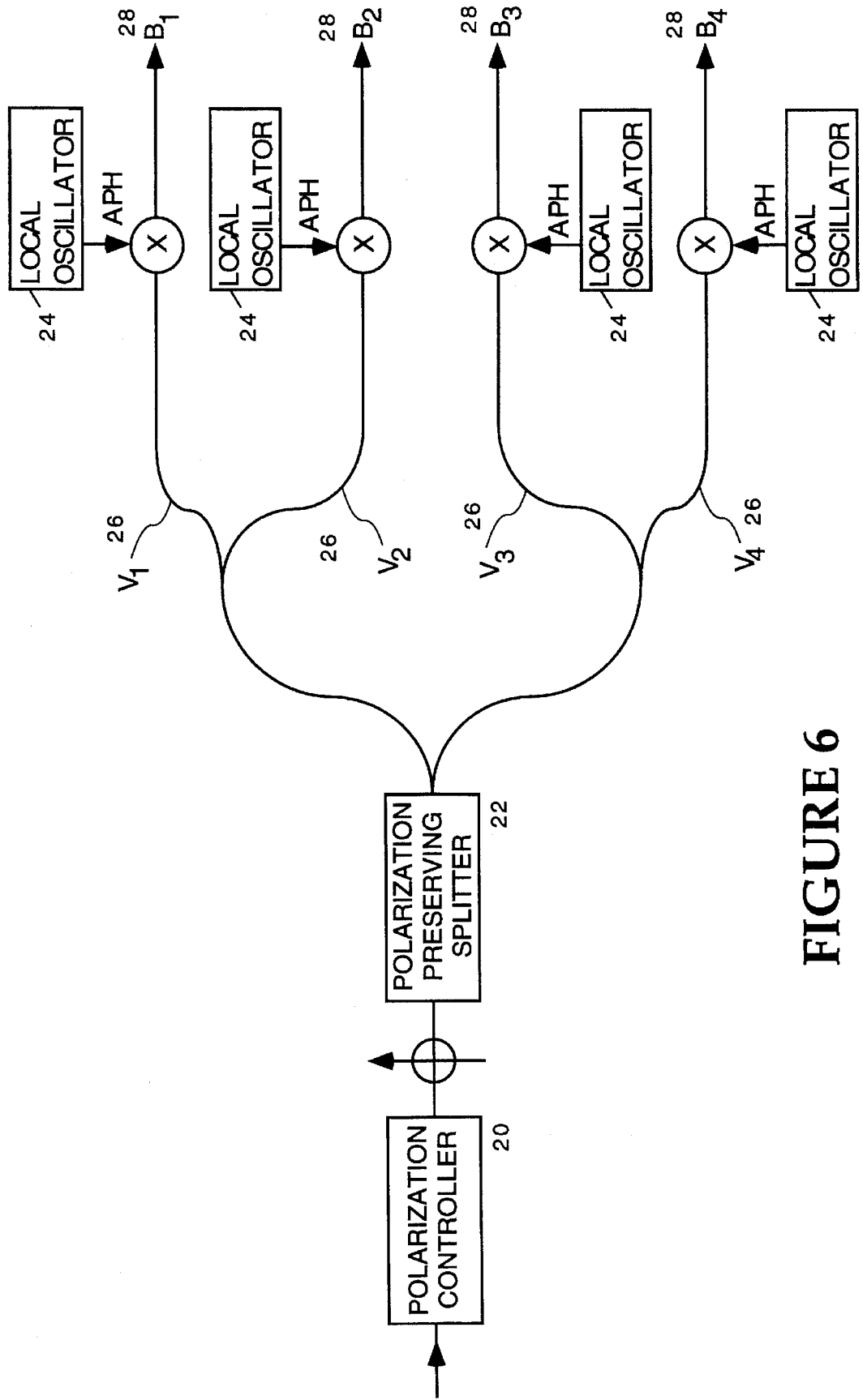
FIG. 6 is a block diagram of a general configuration of a receiver in the present invention.

The coded APH streams may be received by hardware similar to that used to receive polarization multiplexed solitons (see reference [1]). Referring to FIG. 6, the hardware may include at least one polarization controller (which compensates for any random changes in the polarization of the stream) each followed by a polarizer, which separates the original stream into two streams with orthogonal polarizations, each followed by a detector device. One of the two streams from each polarizer is fed into the detector device. The second stream may be fed into a second detector device to be used for polarization control purposes, for example, or it may be discarded because it conveys essentially the same data as the first stream.

Figure 5:
FIG. 5 is a diagram analogous to FIG. 3 showing the reception of polarization modulation coded APH streams of solitons.

The separation of the two polarizations converts the initial pulse stream polarization modulation into amplitude modulation on each of the two output streams and discriminates (to a first approximation ignores) the phase modulation which stabilizes the initial stream. The orientation of the polarization splitter may be chosen on the basis of a criteria 1) to maximize the signal to noise ratio of the detected stream and 2) to optimize the operation of the polarization controller and other devices of the receiver module. The operation of the receiver module is described by way of a non-limiting example for the situation in which the two axes of the polarizer member are respectively orthogonal and parallel to the polarization of the pulses representing the binary digit 0. In this case both channels from the polarizer comprise a series of pulses consisting of the same series of bits amplitude modulation coded complementarily: in the first stream (the polarization of which is orthogonal to that of the pulses representing the digit 0) the presence of a pulse in a time-window represents the binary digit 1 and the absence of a pulse in a time-window represents the digit 0, as in conventional 00 K coding; in the second stream (the polarization of which is parallel to that of the pulses representing the digit 0) the digit 0 is embodied in a pulse of intensity I and, in the case of coding by rotating the polarization 45°, the binary digit 1 is embodied in a pulse of intensity I/2. FIG. 5 shows the signal received split according to two polarizations (orthogonal and parallel to the polarization of the pulses representing the digit 0) on receiving the sequence . . . 011010 . . . conveyed by the stream described with reference to FIG. 3.

The device for detecting these streams may be based on the "direct detection" principle which essentially entails measuring the luminous intensity impinging on the detector during each bit period. This can be done using a photodetector such as a photodiode whose sensitivity curve embraces the optical wavelength of the solitons.

When APH streams are received the streams emerging from the polarizer are also phase modulated, the phase of each pulse being 0 or Π depending on its position within the stream. This modulation was introduced in the APH stream to produce stabilization, while the bits in the stream are coded by amplitude modulation. The optical phase modulation of these pulses enables the use of a second type of detector instead of the photosensor mentioned above. This may be a balanced homodyne detector whose local oscillator is an APH stream of period qL/N (identical to the received APH stream) and whose frame is synchronized to that of the received stream. In this configuration the balanced homodyne detector functions as an "AND" logic gate producing a non-null electrical signal when a pulse of the coded stream reaches the detector and a null electrical signal if a gap is detected in the coded stream.

With reference to FIG. 6, a receiver with multiple output channels each comprising a separate detector will now be described. A polarization controller 20, which compensates for any random changes in the polarization of the soliton stream is coupled to a polarization preserving splitter 22, which separates the original soliton stream into two streams with orthogonal polarizations. The polarization preserving splitter 22, in this example, separates the original stream into four channels 26 (V1, V2 V3 and V4). Each of these channels 26 has an appropriate detector including a local oscillator 24 that emits pulses which may be synchronized to the pulses of the received stream. This synchronization process produces bit information (B1–B4) 28. The example covers the situation in which the total number of channels is four ($V_1$, $V_2$, $V_3$, $V_4$). These channels correspond to the four-channel emitter discussed above. The four channels of the detector device may be obtained either by using a "star coupler" with four output ports connected to one of the two outputs of the polarizer or by using a "Y coupler" with two output ports connected to each of the two outputs of the polarizer.

Each of the four channels has an appropriate detector. As for reception on one channel, a balanced homodyne detector may be used to receive APH streams. To receive four channels, however, the local oscillator must comprise a series of coherent pulses spaced by qL, i.e., by four times the spacing of the received stream. The local oscillator pulses can be synchronized to the pulses of the received stream.

In channel $V_1$ the pulses from the local oscillator are synchronized with the pulses of the received stream which convey bit $B_1$ as defined at the sending end. The balanced homodyne detector then functions as an "AND" logic gate and produces an electrical signal which is non-null for bit $B_1$ and null for all other bits.

For receiving APH streams the electrical signal may be a voltage E (or –E) when a pulse is detected and a null voltage when no gap in the frame is detected.

On channel $V_2$ the local oscillator is synchronized to bit $B_2$ and this bit is selected by detection. $V_3$ and $V_4$ are synchronized in a similar fashion.

As with sending, multi-channel detection has the advantage of being N times slower than the transmission bit rate, so that the detection function can be matched to the bandwidth of currently available opto-electronic components. It also enables optical demultiplexing of N independent channels which are time-division multiplexed at the sending end.

There is claimed:

1. A method for transmitting a stream of solitons comprising the steps of:
generating at least one stream of light pulses, wherein each light pulse is sent inside a time window, wherein consecutive time windows are contiguous and of the same duration, wherein each light pulse has the same shape and the same amplitude, the amplitude being greater than a predetermined threshold required to obtain soliton pulses when the stream propagates in a monomode optical fiber;
stabilizing each soliton inside its time window and thereby stabilizing said stream of solitons by introducing a repulsive interaction between each soliton and the immediately preceding soliton and between each soliton and the immediately following soliton;
coding the light pulses of said stream with data to be transmitted;
injecting said stream of coded light pulses into said monomode optical fiber;
propagating said stream of coded pulses in said monomode optical fiber in the form of soliton pulses, wherein the monomode optical fiber has a non-linear refractive index and an anomalous group velocity dispersion at the optical wavelength of the pulses;
amplifying the soliton pulses optically as they propagate in the fiber; and
receiving and decoding said stream of soliton pulses.

2. The method according to claim 1 wherein the step of stabilizing said stream of solitons by introducing a repulsive interaction further includes the step of optically modulating the phase of the solitons, wherein the phase modulation produces an alternation of $\Pi$ radians in the relative phases between consecutive solitons, wherein the phase alternation stabilizes the stream of solitons.

3. The method according to claim 2 wherein the step of coding includes polarization modulation of the solitons, wherein the polarization modulation preserves the stabilized nature of the stream of solitons.

4. The method according to claims 3 wherein said coding is selected from the group comprising binary coding with two modulation values, discrete coding with M modulation values where M is greater than 2 and analog coding with continuous modulation values.

5. The method according to claim 3 wherein the step of receiving said stream of solitons includes discriminating between modulation which codes the solitons and modulation which stabilizes the solitons.

6. The method according to claim 1 wherein if generation of said stream of light pulses produces a pulse bit rate less than a required transmission bit rate, the value of the generated bit rate is increased to the required transmission bit rate by the following steps:
  i) splitting the generated stream between N identical channels, where N is an integer greater than 1;
  ii) introducing a relative time-delay between the N channels, the time-delay being equal to $qL/N$, where $qL$ is the time interval between the light pulses of the generated stream;
  iii) stabilizing independently each of the N channels in accordance with a protocol by alternation of phase,
  iv) recombining the N channels to produce a series of pulses, wherein the time interval between consecutive pulses is $q_o=q_L/N$, where $q_o$ is equal to a time window of the required bit rate,
wherein the protocol ensures alternating phases in the series of pulses after recombination of the N channels.

7. The method according to claim 6 wherein the coding of the N channels occurs independently on each of the N channels prior to recombination of the N channels according to said protocol, wherein after recombination, the N channels constitute a single data channel.

8. The method according to claim 6 wherein the coding of the N channels occurs independently on each of the N channels prior to the recombination of the N channels, wherein each channel is an independent data channel, wherein, after recombination of the N channels, the N data channels are interleaved and transmitted in a time-division multiplexing configuration, wherein reception of the stream of pulses at the required pulse bit rate includes the step of detecting the N channels, receiving the N channels, and independently time-division demultiplexing each of the channels.

9. An optical transmission system for transmitting at least one stream of solitons said system comprising:
means for generating at least one stream of light pulses, wherein each light pulse is sent inside a time-window, window wherein consecutive time windows are contiguous and of the same duration, wherein each light pulse has the same shape and the same amplitude, the amplitude being greater than a predetermined threshold required to obtain soliton pulses when the stream propagates in a monomode optical fiber;
means coupled to the generating means for coding the light pulses of said stream with data to be transmitted;
means coupled to the coding means for stabilizing each soliton in its time window and thereby stabilizing said stream of solitons by introducing a repulsive interaction between each soliton and an immediately preceding soliton and between each soliton and an immediately following soliton,
means coupled to the coding means for injecting said stream of coded pulses into said monomode optical fiber;
means coupled to the injecting means for propagating the light pulses in the form of soliton pulses, said propagation means including said monomode optical fiber, wherein the optical fiber has a non-linear refractive index and an anomalous group velocity dispersion at the optical wavelength of the pulses;
optical amplification means for amplifying the soliton pulses as they propagate in the fiber; and
means coupled to the optical fiber for receiving and decoding the stream of soliton pulses.

10. System according to claims 9 wherein the means for stabilizing said stream of solitons by introducing repulsive interaction includes at least one optical phase modulator for modulating the solitons to produce an alternation of Π radians in the relative phases between consecutive solitons and to produce a stream stabilized by alternation of phase.

11. The system according to claim 10 wherein said coding means includes at least one soliton polarization modulator to preserve the repulsive interaction between solitons, wherein the repulsive interaction between solitons stabilizes the stream of solitons.

12. The system according to claim 11 wherein the means for receiving said stream of solitons includes means for discriminating between a modulation that codes the solitons and a modulation that stabilizes the solitons.

13. The system according to claim 11 bit further comprising:
   i) means for splitting the generated stream between N identical channels where N is an integer greater than 1;
   ii) means coupled to the splitting means for introducing a relative time-delay between the N channels equal to $q_L/N$ where $q_L$ is the time interval between the pulses of the generated stream, and
   iii) means coupled to the means for introducing a relative time delay for recombining the N channels to produce a stream of pulses, wherein the time interval between consecutive pulses is $q_o=q_L/N$, where $q_o$ is equal to the time window of the required bit rate,
   wherein if the means for operating said stream of light pulses produce a pulse bit rate less than a required transmission bit rate, the generated bit rate is increased to the required transmission bit rate by the splitting means, delay means and the recombining means,
   wherein the means for stabilizing the stream at the required transmission bit rate by alternation of phase operates independently on each of the N channels in accordance with a protocol before the recombining means wherein the protocol ensures alternating phases after recombination of the N channels.

14. The system according to claim 13 wherein the coding means operate independently on each of the N channels before recombination according to said protocol, wherein after the N channels are recombined into a single stream, the N channels constitute a single data channel.

15. The system according to claim 13 wherein the means for coding the N channels operate independently on each of the N channels before recombination, wherein after recombination each of the N channels constitutes an independent channel, wherein said recombination means multiplexes the N independent data channels, and the means for receiving the stream of pulses at the required pulse bit rate includes N channel detector devices, and a demultiplexer for receiving the N independent data channels.

16. A transmitter for sending at least one stream of solitons comprising:
   means for generating at least one stream of light pulses wherein each light pulse is sent inside a time window, and consecutive time windows are contiguous and of a same duration, wherein further each light pulse has the same shape and the same amplitude, the amplitude being greater than a predetermined threshold required to obtain soliton pulses in a monomode optical fiber;
   means coupled to generating means for coding the light pulses of said stream to introduce thereinto data to be transmitted;
   means coupled to coding means for injecting said stream of coded light pulses into said monomode optical fiber, and
   means coupled to generating means for stabilizing each soliton inside its time window and for stabilizing said stream of solitons by introducing a repulsive interaction between each soliton and an immediately preceding soliton and between each soliton and an immediately following soliton.

17. The transmitter according to claim 16 wherein the means for stabilizing said stream of solitons includes at least one soliton optical phase modulator for stabilizing the stream of solitons by producing an alternation of Π radians in the relative phases between consecutive solitons.

18. The transmitter according to claim 17 wherein said coding means includes at least one soliton polarization modulator to preserve the stabilized nature of said stream of solitons.

19. The transmitter according to claim 18 further comprising:
   i) means coupled to the generating means for splitting the generated stream between N identical channels, where N is an integer greater than 1;
   ii) means coupled to the splitting means for introducing a relative time-delay between the N channels, the time-delay being equal to $q_L/N$, where $q_L$ is the time interval between the pulses of the generated stream; and
   iii) means coupled to the delay means for recombining the N channels producing a stream of pulses in which the time interval between consecutive pulses $q_o=q_L/N$, where $q_o$ is equal to the time window of the required bit rate;
   wherein if the means for generating said stream of light pulses produce a pulse bit rate less than a required transmission bit rate, the generated bit rate is increased to the required transmission bit rate by the splitting means, delay means, and the recombining means,
   wherein the means for stabilizing the stream at the required transmission bit rate by alternation of phase operates independently on each of the N channels in accordance with a protocol before the recombining means, wherein the protocol ensures alternating phases after recombination of the N channels.

20. The transmitter according to claim 19 wherein the coding means operates independently on each of the N channels according to said protocol, wherein after the N channels are recombined into a single stream, the N channels constitute a single data channel.

21. The transmitter according to claim 19 wherein the means for coding the N channels operates independently on each of the N channels before recombination, wherein the N channels after recombination constitutes an independent data channel, wherein the recombination means multiplexes the N independent data channels, wherein the means for receiving the stream of pulses at the required pulse bit rate includes N channel detector devices, and a demultiplexer for receiving the N independently detected channels.

22. A receiver for receiving at least one stream of solitons comprising at least one polarization controller for compensating for any random changes in polarization of the stream of solitons, means coupled to said polarization controller for discriminating between a modulation that codes the solitons and a modulation that stabilizes said stream of solitons by introducing a repulsive interaction between each soliton and an immediately preceding soliton and between each soliton and an immediately following soliton.

23. The receiver according to claim 22 wherein each soliton stabilized by soliton optical phase modulation, said phase modulation producing an alternation of $\Pi$ radians in the relative phases between consecutive solitons, said phase modulation further stabilizing a stream of solitons wherein the solitons are coded by polarization modulation, and wherein said discrimination means includes a polarization splitter.

24. The receiver according to claim 23 further comprising N channel detector devices, where N is an integer greater than 1 and a demultiplexer coupled to the detector devices for receiving N independently detected channels and a stream having a soliton transmission bit rate greater than a required reception bit rate.

* * * * *

UNITED STATES PATENT AND TRADEMARK OFFICE
CERTIFICATE OF CORRECTION

PATENT NO.   : 5,502,588
DATED        : March 26, 1996
INVENTOR(S)  : Izo Abram

It is certified that errors appear in the above-identified patent and that said Letters Patent is hereby corrected as shown below:

In column 10 at line 21 please delete " qo " and insert -- $q_o$ --.

In column 14 at line 38 please delete " window ".

In column 15 at line 14 please delete " bit ".

In column 15 at line 27 please delete " operating " and insert -- generating --.

In column 17 at line 2 please delete " soliton stabilized " and insert
-- soliton is stabilized --.

In column 17 at line 5 please delete " solitons " and insert -- solitons, --

Signed and Sealed this

Sixth Day of August, 1996

Attest:

BRUCE LEHMAN

Attesting Officer          Commissioner of Patents and Trademarks